(12) United States Patent
Greget (10) Patent No.: US 10,429,675 B2
(45) Date of Patent: Oct. 1, 2019

(54) SYSTEM FOR USING AUGMENTED REALITY FOR VISION

(71) Applicant: Mark Greget, Newport Beach, CA (US)

(72) Inventor: Mark Greget, Newport Beach, CA (US)

( * ) Notice: Subject to any disclaimer, the term of this patent is extended or adjusted under 35 U.S.C. 154(b) by 128 days.

(21) Appl. No.: 15/564,057

(22) PCT Filed: Mar. 31, 2017

(86) PCT No.: PCT/US2017/025584
§ 371 (c)(1),
(2) Date: Oct. 3, 2017

(87) PCT Pub. No.: WO2018/182734
PCT Pub. Date: Oct. 4, 2018

(65) Prior Publication Data
US 2019/0121168 A1    Apr. 25, 2019

(51) Int. Cl.
*G02C 11/00* (2006.01)
*G02B 27/01* (2006.01)
(Continued)

(52) U.S. Cl.
CPC .......... *G02C 11/10* (2013.01); *G02B 27/0172* (2013.01); *G02B 27/0176* (2013.01); *G02B 2027/014* (2013.01); *G02B 2027/0138* (2013.01); *G02B 2027/0141* (2013.01); *G02B 2027/0178* (2013.01);
(Continued)

(58) Field of Classification Search
CPC ...... G02C 11/10; G02B 27/01; G02B 27/017; G02B 27/0179; G02B 27/0093; G02B 27/0101; G02B 2027/0118; G02B 2027/0138; G02B 2027/014; G02B 2027/0141; G02B 2027/0178; G02B 2027/0185; G02B 2027/0187
See application file for complete search history.

(56) References Cited

U.S. PATENT DOCUMENTS

8,976,086 B2 *   3/2015   Hilkes ..................... G09G 5/00
                                                          345/8
9,955,862 B2 *   5/2018   Freeman ............. A61B 3/0025
(Continued)

*Primary Examiner* — Sardis F Azongha
(74) *Attorney, Agent, or Firm* — Pasadena Legal Group; Norman R. Van Treeck (57) ABSTRACT

A computer-implemented system and method for an augmented reality system for vision, operable and upgradeable on different portable, wearable and self-contained hardware platforms that is easily adjustable by the user. The system comprises at least: a frame; one or more than one display lenses attached to the frame; one or more than one camera operably connected to the frame; communications means for transferring power and data to the hardware platform connected to the frame; an input device for controlling the hardware platform; one or more than one processor; and a storage. The system executes instructions to automatically detect the hardware capabilities of the hardware. Loading and installing applications to the user based on the detected hardware. Changing the magnification and contrast to view the selected application, where the contrast adjustment uses filters specifically designed to enhanced the visually impaired experience.

8 Claims, 9 Drawing Sheets

(51) Int. Cl.
G06F 3/0482 (2013.01)
G06F 3/0484 (2013.01)
G06F 3/16 (2006.01)

(52) U.S. Cl.
CPC .... *G02B 2027/0187* (2013.01); *G06F 3/0482* (2013.01); *G06F 3/04845* (2013.01); *G06F 3/16* (2013.01)

(56) References Cited

U.S. PATENT DOCUMENTS

| | | | |
|---|---|---|---|
| 2002/0075201 A1* | 6/2002 | Sauer | G02B 27/017 345/7 |
| 2010/0079356 A1* | 4/2010 | Hoellwarth | G02B 27/017 345/8 |
| 2013/0346168 A1* | 12/2013 | Zhou | G06F 1/163 705/14.4 |
| 2016/0217327 A1* | 7/2016 | Osterhout | G02B 27/017 |
| 2016/0270656 A1* | 9/2016 | Samec | A61B 3/085 |
| 2017/0249862 A1* | 8/2017 | Border | H04N 7/183 |
| 2018/0180893 A1* | 6/2018 | Gupta | G02B 27/0176 |

* cited by examiner

SYSTEM FOR USING AUGMENTED REALITY FOR VISION

FIELD OF THE INVENTION

The present invention is in the technical field of augmented reality, and more particularly to a method for using augmented reality for vision operable on different hardware platforms that is easily adjustable by the user.

BACKGROUND

The current estimated number of people visually impaired in the world is 285 million, of that, 246 million suffer from having low vision. There are an estimated 60 million people in the United States & Europe with low vision. Due to an aging populace, by 2030, vision loss rates will almost double. This is an average of 27.25 thousand per million population. Current products for treating people with a visual impairment have not kept pace with mainstream technology. The implementation of the Augmented Reality (AR) and Virtual Reality (VR) systems has not occurred outside of the gaming. There are qualities in AR and VR technology that can assist people that suffer from low vision and other uses that can move the AR and VR systems from its current novelty use to a life changing system.

Others have attempted to provide some assistance using proprietary systems, such as, for example, U.S. Pat. No. 8,135,227 to Esight Corporation, titled "Apparatus and method for augmenting sight." Disadvantageously, the Esight patent requires extensive involvement of medical and ophthalmological personnel to: determine "the locations of retinal damage in an eye of the patient" and obtain "an image of a scene viewed by the patient" and then "mapping, using a processor, the image to a display in such a way to avoid the locations of retinal damage when the display is viewed by the patient." This process, while workable, does not take into the consideration the time and effort required to accomplish this task. Further, the Esight invention must be recalibrated every time the patient's eyesight changes. This non-adjustable, time consuming method is unsuited to seniors or others with low vision as they must continually have the system adjusted by professionals.

Along with the Esight system noted above, other available systems and methods have failed to develop deliverable markets. Each product attempts to solve a singular vision issue by making complicated technology. To date, many virtual and augmented reality wearable systems developed have not lived up to expectations or have simply failed to deliver any results.

These factors have stalled wide implementation of AR/VR. Current low vision technology solutions prevented these collaborative efforts due to limitations in portability, weight and size. Current products use a lot of space which is why few eye doctors dispense them to patients or end users. The currently available platforms are not internet enabled and applications cannot be added. Most comprise both proprietary hardware and software in an attempt to "lock" users into a particular platform ecosystem. The products also require a technician to go to the user's home to install the system. Many require the user to go to a doctor and have the system calibrated to what the doctor believes is the best view for them. Currently available technology is not portable and cannot be used outside the home with few exceptions. Thereby limiting the usefulness of the system.

Additionally, using AR/VR in the surgical and dental space has been limited to one set of magnification only, the current devices cannot record, take pictures, email, or link back the surgery to electronic medical records. The currently available surgical and dental loupes are also heavy which create neck strain on the doctor.

Therefore, there is a need for an augmented reality system for vision, operable and upgradeable on different hardware platforms that is easily adjustable by the user.

BRIEF DESCRIPTION OF THE DRAWINGS

These and other features, aspects and advantages of the present invention will become better understood with regard to the following description, appended claims, and accompanying figures where:

SUMMARY

The present invention overcomes the limitations of the prior art by providing an augmented reality system for vision, operable and upgradeable on different hardware platforms that is easily adjustable by the user. A minimal system comprises a frame, one or more than one display lenses attached to the frame, one or more than one camera operably attached to the frame, wired, wireless or both wired and wireless communications means for transferring power, data or both power and data to the hardware platform connected to the frame, a wired, wireless or both wired and wireless input device for controlling the hardware platform comparably connected to the frame, one or more than one processor for executing instructions connected to the frame, and a storage attached to the processor for storing instructions, applications and data connected to the frame. The instructions operable on the processor comprise powering the system, loading instructions from a storage into one or more than one processor, displaying information about the system to the user, displaying a selection menu to the user, accepting inputs from the user adjusting the image displayed, and executing instructions for a selected menu item.

The system further comprises a battery connected to the frame for powering the hardware platform, a microphone operably connected to the frame, one or more than one audio output device connected to the frame, and a remote control operably connected to the processor for transmitting commands. The system further comprises one or more than one removable lens located in front of the one or more than one camera for capturing images. The lenses can also be of various magnification levels to assist the camera for patients with magnification needs that exceed the hardware provided.

There is also provided a method for using an augmented reality system for vision, operable and upgradeable on different hardware platforms that is easily adjustable by the user. The method comprises the steps of first placing an augmented reality system for vision on a user's head and in front of the user's eyes. Then powering the system. Next, loading instructions from a storage into one or more than one processor. Then, displaying information about the system to the user. Next, displaying a selection menu to the user. Then, accepting inputs from the user adjusting the image displayed. Next, executing instructions for a selected menu item. Finally, repeating the steps above until the system is powered off.

There is also provided a computer-implemented method for an augmented reality system for vision, operable and upgradeable on different portable, wearable and self-contained hardware platforms that is easily adjustable by the user, comprising executing on one or more than one processor. First, by providing a portable, wearable and self-contained hardware platform. Where the hardware comprises at least a frame, one or more than one display lenses attached to the frame, one or more than one camera operably connected to the frame, wired, wireless or both wired and wireless communications means for transferring power, data or both power and data to the hardware platform connected to the frame, a wired, wireless or both wired and wireless input device for controlling the hardware platform operably connected to the frame, one or more than one processor for executing instructions connected to the frame, and a storage attached to the processor for storing instructions, applications and data connected to the frame. Then, executing instructions on the one or more than one processor to automatically detect the hardware capabilities of the portable, wearable and self-contained hardware platform. Next, loading and installing instructions for a user onto the portable, wearable and self-contained hardware platform. Then, displaying available applications to the user based on the detected hardware available on the portable, wearable and self-contained hardware platform. Next, selecting an available application. Then, retrieving the selected application from a storage connected to the one or more than one processor. Next, executing the retrieved instructions for the selected application. Then, changing the magnification to view the selected application. Next, changing the contrast of the selected application using the track pad, the remote control or by voice command. The step of selecting an available application is performed using a track pad. The step of selecting an available application is performed using a remote control. The step of selecting an available application is performed using a voice command.

The method further comprises auto-focusing the one or more than one display lenses, where the one or more than one display lenses are set to continuous auto focus but locked at set distances determined by magnification settings. Adjusting a magnification of the one or more than one display lenses. Selecting and overlaying contrast filters specifically designed to enhanced the visually impaired experience above a threshold. Enabling hands free control using various voice frequencies and algorithms set to commands and key phrases that control the portable, wearable and self-contained hardware platform. Executing instructions located on the portable, wearable and self-contained hardware platform for reading back text, signs or any printed material. Recording multimedia information from the portable, wearable and self-contained hardware platform. Displaying an onboard gallery of the stored multimedia information. Electronically changing the lens attached to the one or more than one camera to take a 50 degree electronically magnified image at distances of great than 50+ feet and editing the field of view down to 30 degree creating a clear image. The magnification can be adjusted to, but not limited to, 0× magnification (or no magnification) up to at least 12× magnification, depending on the available hardware. The step of reading back text, signs or any printed material is operable to a distance of at least 10 feet from the one or more than one camera within the system without using any external services. The multimedia information is stored to the storage attached to the one or more than one processor for later download. Additionally, the multimedia information is transmitted wired, wirelessly or both wired and wirelessly to a secure server or electronic medical record.

DETAILED DESCRIPTION OF THE INVENTION

The present invention overcomes the limitations of the prior art by providing an augmented reality system for vision, operable and upgradeable on different hardware platforms that is easily adjustable by the user. Almost all the available AR/VR platforms today are used for gaming and virtual tours. However, in the vision field, there are only a handful of systems that attempt to improve the lives of people with macular degeneration and other vision ailments. These systems are limited in their approach and not user friendly. Most require constant recalibration and visits to a technician or a doctor to "re-adjust" the device so that it can be useful to the user again. However, this leads to many complaints by the users because vision changes on a daily basis. Using the present invention, constant re-adjusts are done by the user to get the best view for them at that time under changing conditions. For example, going to a movie will require several vision adjustments that can't be accomplished by currently available devices. However, these adjustments are easily done, on the fly, by using the present invention. The cost for the proprietary hardware is also prohibitive to many lower income and disabled individuals. The present invention is hardware agnostic, thereby allowing it to be used on any system meeting the minimum requirements. The present invention lowers the entry point, is portable between devices and is customizable by the user, thereby overcoming all the limitations of the prior art.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any system or part of a system or system disclosed in this disclosure will be determined by its intended use.

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more systems for storing data, including read-only memory (ROM), random access memory (RAM), magnetic disk storage mediums, optical storage mediums, flash memory systems and/or other non-transitory machine readable mediums for storing information. The term "machine readable medium" includes, but is not limited to portable or fixed storage systems, optical storage systems, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral systems.

In the following description, certain terminology is used to describe certain features of one or more embodiments of the invention.

Various embodiments provide an augmented reality system for vision, operable and upgradeable on different hardware platforms that is easily adjustable by the user. One embodiment of the present invention provides a system for using augmented reality for vision. In another embodiment, there is provided a method for using the system. the system and method will now be disclosed in detail.

Figure 1:
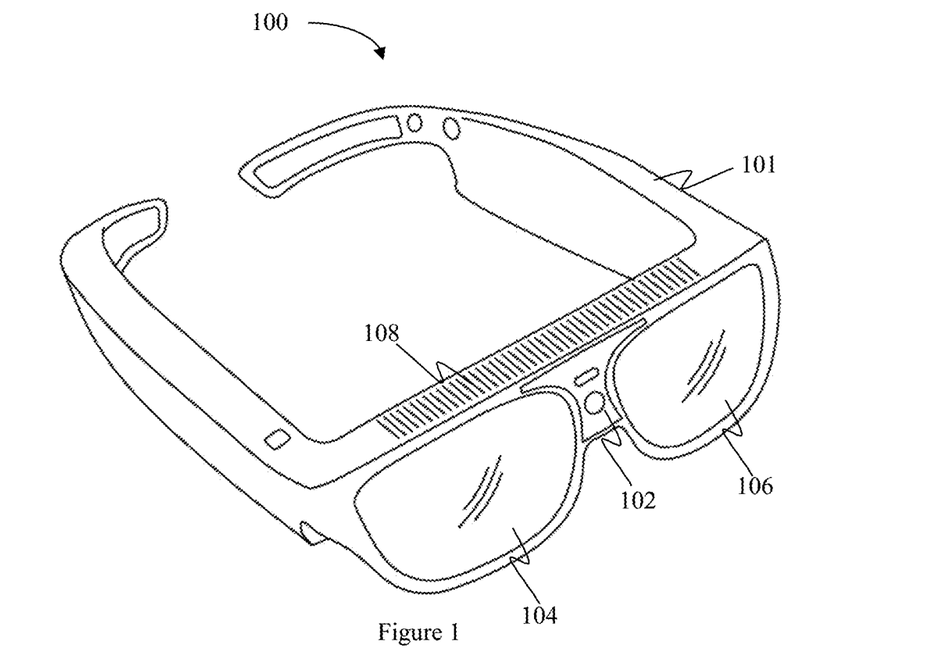
FIG. 1 is a perspective view of an augmented reality system for vision, operable and upgradeable on different hardware platforms that is easily adjustable by the user, according to one embodiment of the present invention.

Referring now to FIG. 1, there is shown a perspective view of an augmented reality system 100 for vision, operable and upgradeable on different hardware platforms that is easily adjustable by the user, according to one embodiment of the present invention. The system 100 comprises at least a frame 101, one or more than one camera 102 attached to the frame and one or more than one display lenses 104 and 106 attached to the frame. The frame 101 is generally shaped like a pair of glasses, or sunglasses depending upon a user's requirements. The one or more than one camera 102 can be located anywhere on the frame 101 that would enable the one or more than one camera 102 to have an unobstructed forward view that would be the same as the user would normally see. Optionally, additional cameras can be located on the frame 101 to expand the user's views or provide extra functionality for a particular job or purpose.

Also, included in the frame 101 is one or more than one processor 108 and a storage (not shown). The one or more than one processor 108 and the storage are sized for the appropriate usage of the system 100. A typical system 100 would preferably have at least a quad processor and 4 gigabytes RAM and 4 gigabytes of storage located in the frame 101. External expansion ports, as known in the industry, are also possible additions to the frame 101.

Figure 2:
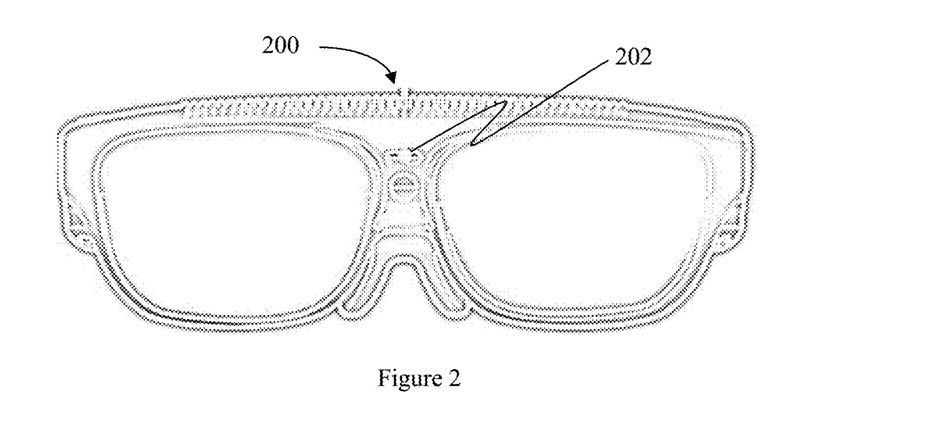
FIG. 2 is a Front view of the system of FIG. 1.

Referring now to FIG. 2, there is shown a front view 200 of the system of FIG. 1. The frame 101 can also comprise one or more than one light 202 that can be used in low light situations or where extra light is need to enhance the image taken by the one or more than one camera 102 and presented to the user on the one or more than one display lenses 104 and 106. Additionally, the one or more than one light 202 can be automatically controlled by instructions executable on the one or more than one processor 108 depending on the application of the system 100.

Figure 3:
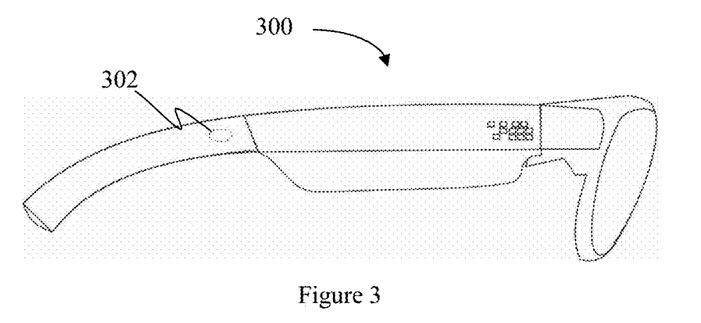
FIG. 3 is a Side view of the system of FIG. 1.

Referring now to FIG. 3, there is shown a side view 300 of the system of FIG. 1. Optionally, the frame 101 comprises a head strap attachment 302 so that the system 100 is not accidentally dropped.

Figure 4:
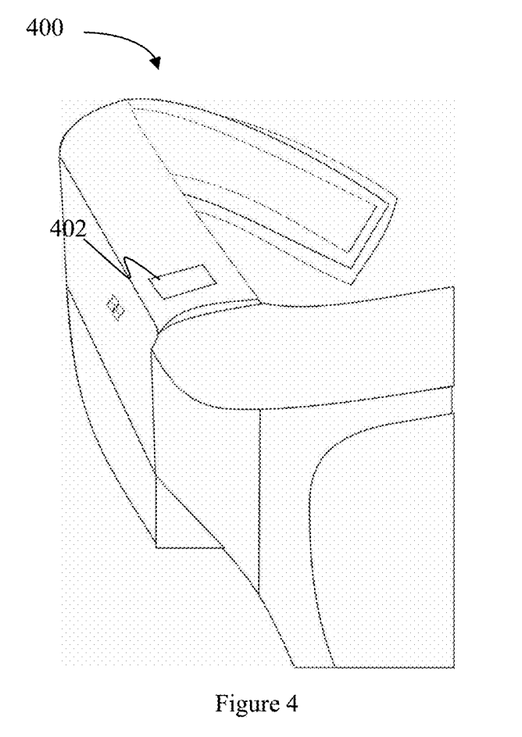
FIG. 4 is a top left view of the system of FIG. 1.

Referring now to FIG. 4, there is shown a top left view 400 of the system of FIG. 1. The system 100 further comprises a track pad 402 or other selection mechanism that can be used by the user to make choices from applications presented to the user on the one or more than one display lenses 104 and 106 or by the system. As will be understood by those will skill in the art with reference to this disclosure, the track pad 402 can be wired, wireless or both wired and wireless depending on the manufacturer of the frame 101. The track pad 402 is used like a mouse or a keyboard from a desktop computer system, as is known in the art. The size and shape of the track pad 402 is determined by the manufacturer of the frame 101. The system 100 will automatically detect and enable the track pad 402 upon startup.

Figure 5:
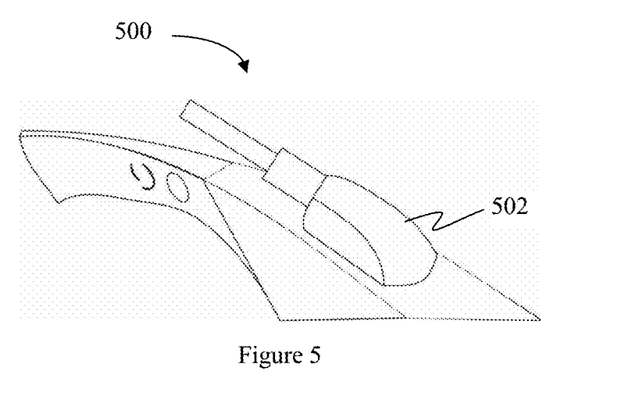
FIG. 5 is a top right view of the system of FIG. 1.

Referring now to FIG. 5, there is shown a top right view 500 of the system of FIG. 1. As can be seen, the frame 101 also comprises a connection for a power and data cable 502. The power and data cable 502 can be wired, wireless or both wired and wireless to provide communications and a means for transferring power, data or both power and data to the hardware platform connected to the frame 101. The frame 101 further comprises an internal battery (not shown) to store power to enable the system 100 to be truly mobile and non-limiting as is the case with most currently available devices. The power and data cable 502 provides power to charge the system 100 and a wired ability to download, upload or both download and upload data to and from the system 100. Additionally, the system 100 comprises a wireless communications processor that can transfer data to and from the system 100 without the need for the power and data cable 502. As can be appreciated, future technology may enable the resupply of power to the system 100 without the need for the power and data cable 502. The description above is not meant to be limiting, but an exemplar of what is currently possible. Future developments in communication and power transfer are anticipated by this invention.

Figure 6:
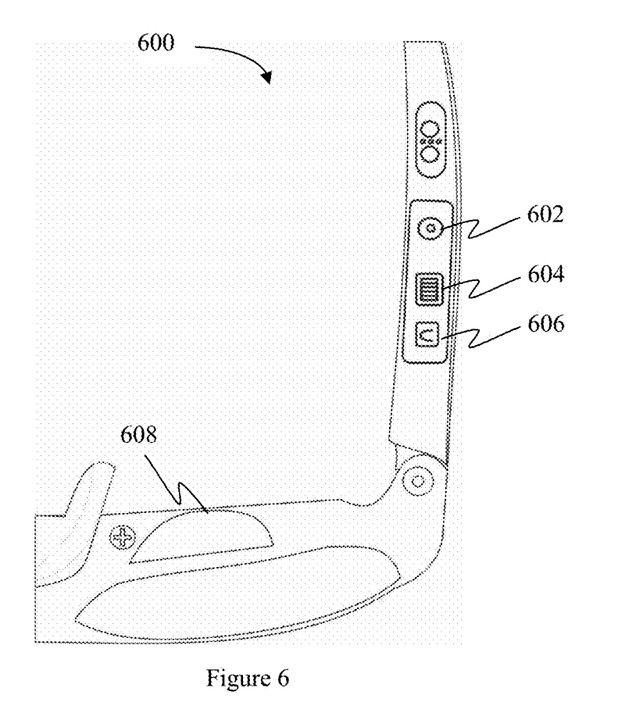
FIG. 6 is a bottom right view of the system of FIG. 1.

Referring now to FIG. 6, there is shown a bottom right view 600 of the system of FIG. 1. The system 100 further comprises a light button 602 connected to the frame 101, a menu button 604 connected to the frame for an alternative selection means for the user, and a back button 606 as an additional method of exiting a selection displayed on the one or more than one display lenses 104 and 106 by the system 100. The light button 602 can be used as a physical means of turning on the one or more than one light 202 by the user. Voice commands and software selections are also available to the user for controlling the one or more than one light 202. A battery compartment is also located on the bottom right 600 of the frame 101 to power the system 100.

Figure 7:
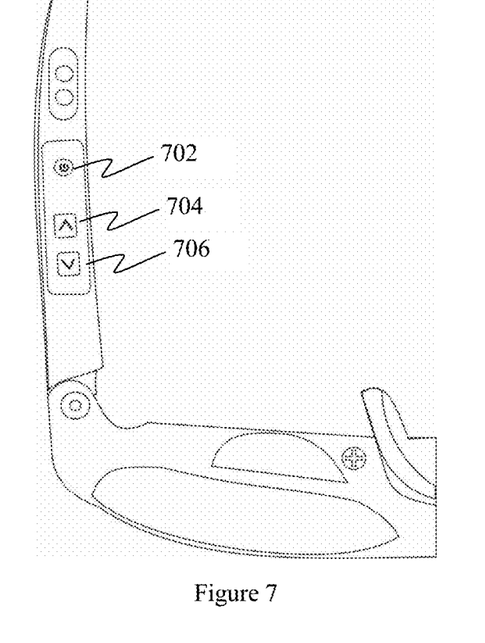
FIG. 7 is a bottom left view of the system of FIG. 1.

Referring now to FIG. 7, there is shown a bottom left view 700 of the system of FIG. 1. As can be seen, a power button 702 is connected to the bottom left 700 of the frame 101. A decrease magnification button 704 and an increase magnification button 706 are also connected to the bottom left 700 of the frame 101. The power button 702 physically turns the system 100 on or off. Optional voice commands can also be used to power the system 100 on and off as is known in the art. The user can physically adjust the magnification from the one or more than one camera 102 that is displayed on the one or more than one display lenses 104 and 106. As before, voice commands or other remote operations are also envisioned as being used to perform the same functions as the decrease magnification button 704 and the increase magnification button 706.

Figure 8:
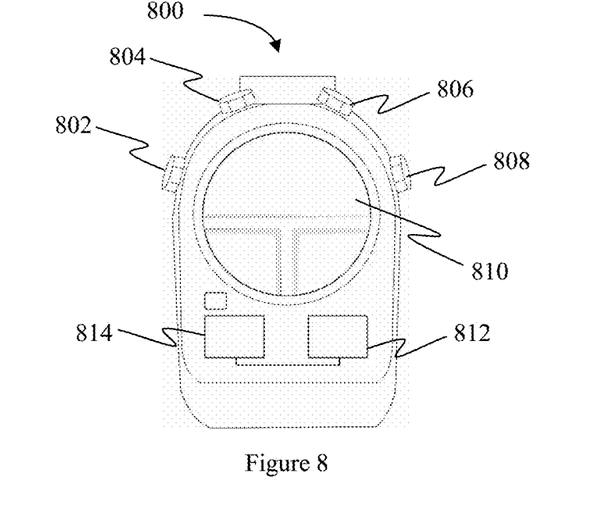
FIG. 8 is a top view of a remote control useful for the system of FIG. 1.

Referring now to FIG. 8, there is shown a top view of a remote control 800 useful for the system of FIG. 1. In this embodiment, the remote control 800 comprises a remote light button 802, a remote television/streaming button 804, a remote quick menu button 806, a remote optical character recognition button 808, a remote contrast control 810, a remote magnification increase button 812, and a remote magnification decrease button 814 connected to the remote control 800. The remote control 800 is wirelessly connected to the system 100 and in communication with the one or more than one processor 108. The remote control 800 is programmable by the user so other functions are possible. The remote light button 802 will turn the one or more than one light 202 on and off. The remote television/streaming button 804 will signal the one or more than one processor 108 to execute instructions for any of the available streaming/television services that are transmitted wirelessly. The streaming/television service is then displayed on the one or more than one display lenses 104 and 106. Optionally, the remote control 800 can be programmatically changed to operate as a remote for various software that is executed on the system 100.

Figure 9:
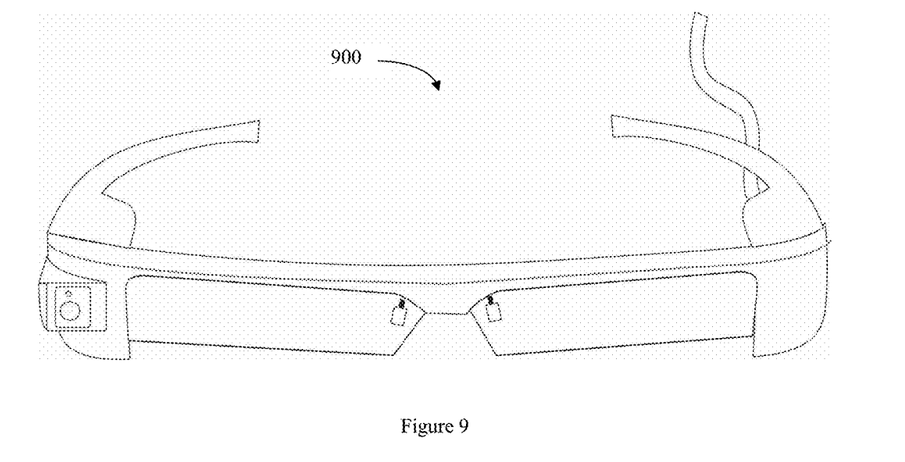
FIG. 9 is a perspective view of a system for using augmented reality for vision in telehealth, according to another embodiment of the present invention.

Referring now to FIG. 9, there is shown a perspective view of a system 900 for using augmented reality for vision in telehealth, according to another embodiment of the present invention. The advantages of the present invention over the prior art a extremely useful in the telehealth system 900. As can be appreciated, the health field has a variety of needs that cannot be met with a single device. Using the present invention overcomes these limitations by providing a way to have multiple specialties and emergency services use AR/VR technology to assist in their work. For example, an expensive pair of AR/VR devices would potentially be destroyed for in the field emergency services. However, using the present invention, low cost AR/VR systems can be provided to the field without fear of cost. The applications loaded onto the telehealth system 900 can be customized for a particular need, or be useful for transmitting data back to the hospital for review by waiting doctors. Lifesaving information and procedures can be transmitted back and forth to save patients' lives. Additionally, the information gathered by the emergency services personnel can be transferred seamlessly to surgeons or other attending doctors to speed up the process of intake and diagnosis. Even administrative personnel can receive information while the patient is enroute to the hospital so that admittance paperwork can be efficiently processed.

More expensive telehealth systems 900 can be reserved for operating rooms, dental offices and other areas not prone to excessive stresses and where a medical loupe might be used, so that x-ray, CAT scan, MM or other required information is available immediately by voice command to the medical professional. For example, multiple surgeons working on a single patient can easily access the information and share information relevant to the patient all without using their hands. Specific medical information, or little known procedures can be displayed to the medical personnel on demand. Other medical specialists can also observe the procedures and assist. Additionally, student training can be more easily accomplished as the students would have an actual point of view of the procedure in real time.

Figure 10:
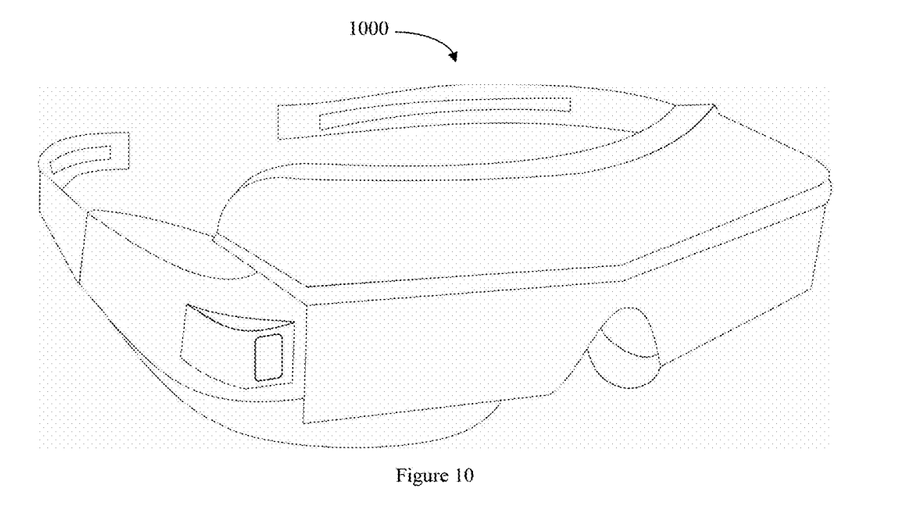
FIG. 10 is a perspective view of a low cost system for using augmented reality for vision, according to another embodiment of the present invention.

Referring now to FIG. 10, there is shown a perspective view of a system 1000 for using augmented reality for vision, according to another embodiment of the present invention. The low cost system 1000 can be used for patients that are on a fix or low income. The low cost system 1000 can have fewer hardware options, as long as the minimum system requirements of a frame; one or more than one display lenses attached to the frame; one or more than one camera operably attached to the frame; wired, wireless or both wired and wireless communications means for transferring power, data or both power and data to the hardware platform connected to the frame; a wired, wireless or both wired and wireless input device for controlling the hardware platform operably connected to the frame; a processor for executing instructions connected to the frame; and a storage attached to the one or more than one processor 108 for storing instructions, applications and data connected to the frame. This minimum system requirement will provide all the basic functionality need for users with low vision and other companionable ophthalmological ailments.

Figure 11:
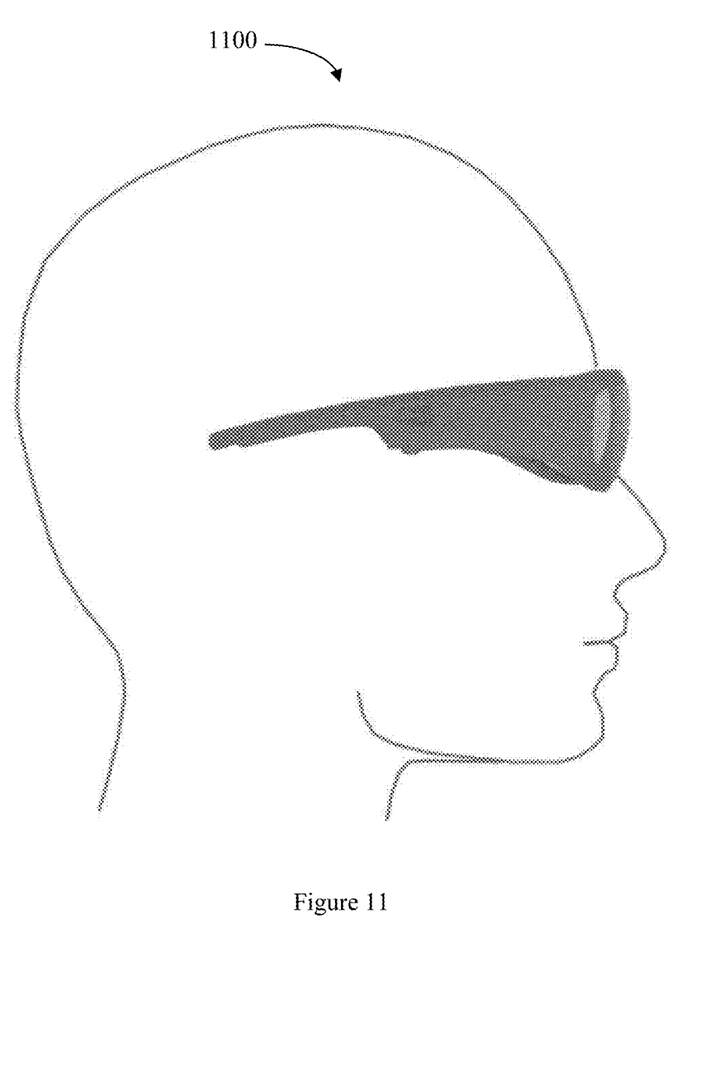
FIG. 11 is a drawing of the system of FIG. 1 being used by a user.

Referring now to FIG. 11, there is shown a drawing of the system 100 being used by a user 1100. As can be seen, the user 1100 only has to place the system 100 on their person in similar fashion of eyeglasses. The user 1100 then only needs to press the power button 702 to start the system operating. Once the system 100 has loaded all the commands and optional software available for the particular system 100 and is fully operational, the user 1100 can then adjust the system 100 to view whatever the user 1100 desires for optimal comfort. Optionally, a head strap can be attached to the frame 101 to secure the system 100 onto the user.

Figure 12:
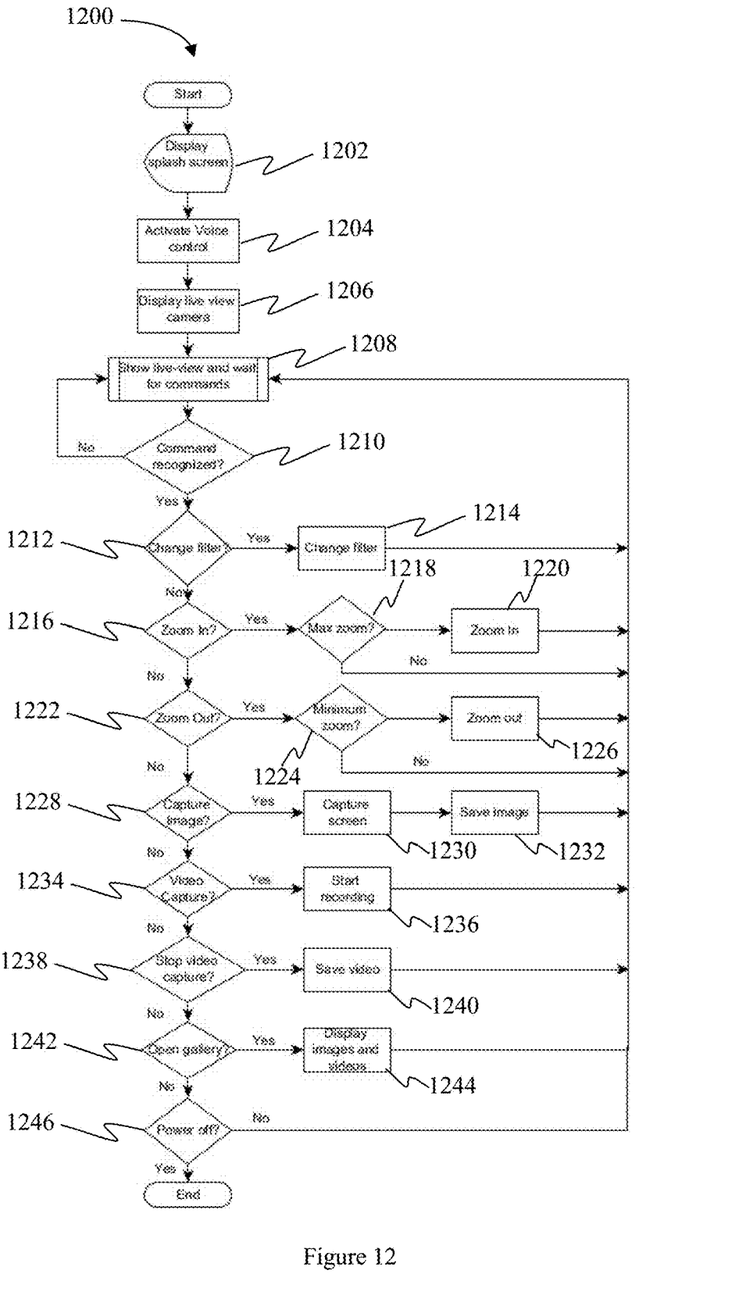
FIG. 12 is a flowchart diagram of some steps of a method for using a system of augmented reality for vision, according to one embodiment of the present invention.

Referring now to FIG. 12, there is shown a flowchart diagram 1200 of some steps of a method for using a system of augmented reality for vision, according to one embodiment of the present invention. In this embodiment, the system 100 displays a splash screen 1202. The user 1100 can see information related to the version of the system and other important information about the system 100 prior to operation. The splash screen 1202 display also provides time for the system 100 to load all the instructions from the storage. Next, voice control 1204 is activated so that the user 1100 can control the system 100 using voice commands. Then, a live view 1206 from the camera 104 is shown on the display lenses 104 and 106.

The advantages over the coemption are the following:

1. Auto-Focus set to continuous but locked at set distances determined by magnification settings
2. Variable magnification inclusive but not limited to 0× (or no mag) up to 12×
3. Contrast or augmented reality threshold filters specifically designed to enhanced the visually impaired experience.
4. Voice In/Voice Out—A large variance of voice frequencies and algorithms set to commands and key phrases that control the smartglasses enabling hands free control
5. TTS/OCR—The augmented reality software ecosystem has the ability to read back text, signs or any printed material up to but not limited to 10 ft from said device.
6. Voice Controlled Recording or picture taking—For purposes of visually impaired and/or surgical and dental loupes the software can record or take pictures via voice commands, then stored to an on-board gallery or be emailed to a secure server or electronic medical record.
7. On Board Gallery—The software ecosystem contains within it a secure gallery that can store images and recordings
8. 2× Lens (hardware). The lens has the ability but not limited to take a 50 degree electronically magnified image at distances of great than 50+ feet and cut the field of view down to 30 degree in turn creating a clear image. The lens can also be affixed or taken off of the smart glasses.

Figure 13:
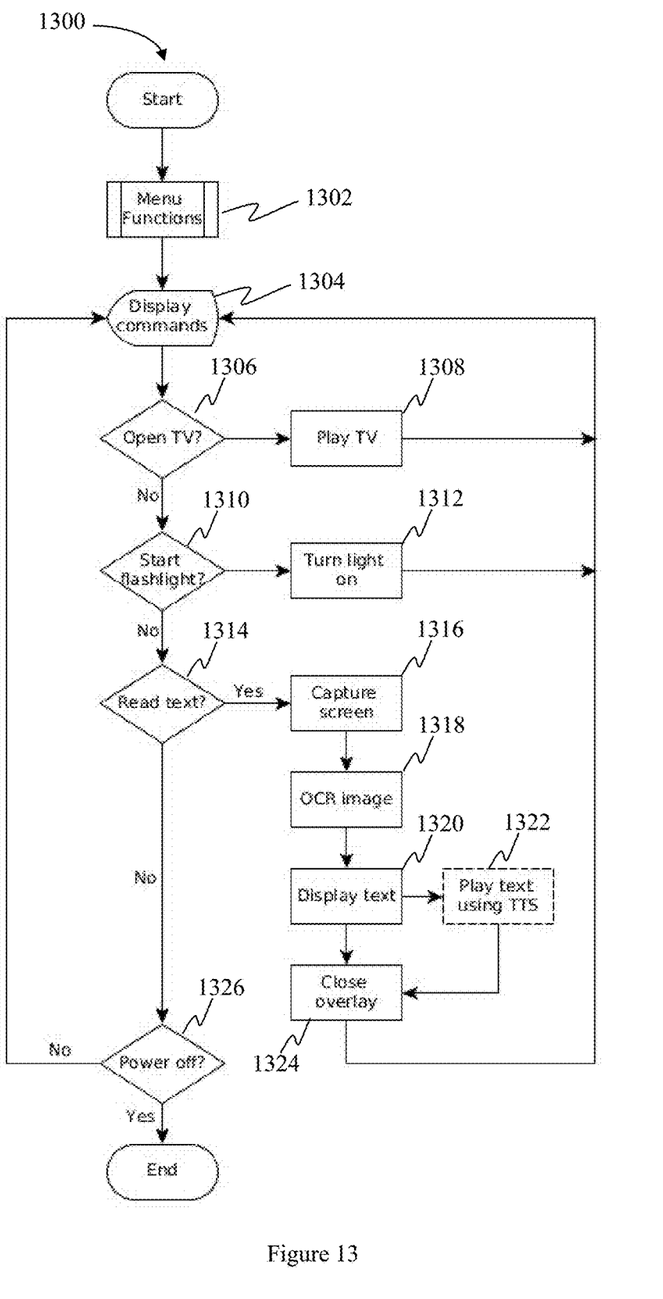
FIG. 13 is a flowchart diagram of some steps of a method for operating the system for augmented reality for vision of FIG. 1.

Referring now to FIG. 13, there is shown a flowchart diagram 1300 of some steps of a method for operating the system for augmented reality for vision of FIG. 1. In this embodiment, the flowchart diagram 1300 details how the remote control 800 is operated by the user. First, when the user presses the remote quick menu button 806, displayed commands 1304 in a menu functions 1302 are displayed on the one or more than one display lenses 104 and 106. Next, the system 100 waits for a command to be selected from the menu functions 1302. Then, if the open streaming/television 1306 is selected from the displayed commands 1304, the system 100 will execute instructions to play the streaming/television 1308. Next, if the remote light button 802 is selected, the system 100 will execute instructions 1310 to turn the one or more than one light 202 will be turned on or off 1312 depending on the state of the one or more than one light 202. Then, the system 100 will monitor if the remote optical character recognition button 808 is pressed to determine if the user would like to read a text 1314. The one or more than one camera 102 will capture a screen shot 1316 of a text in front of the user. Additionally, the one or more than one processor 108 will retrieve executable instructions to perform optical character recognition 1318 (OCR) on the text in the image. Also, the system 100 will execute instructions to either display the text 1320 and/or image on the one or more than one display lenses 104 and 106 or optionally execute instructions to covert the text to audio 1322 and play the audio back to the user. The text to voice option will only be available if the system 100 comprises the optional speaker or headphones that are automatically be detected by the system 100 on startup. Systems that do not have audio playback capabilities will not present that option to the user. The system 100 will then close the text overlay 1324 once the user releases remote optical character recognition button 808. Finally, the user can power off 1326 the system 100 when the user is no longer using it.

Figure 14:
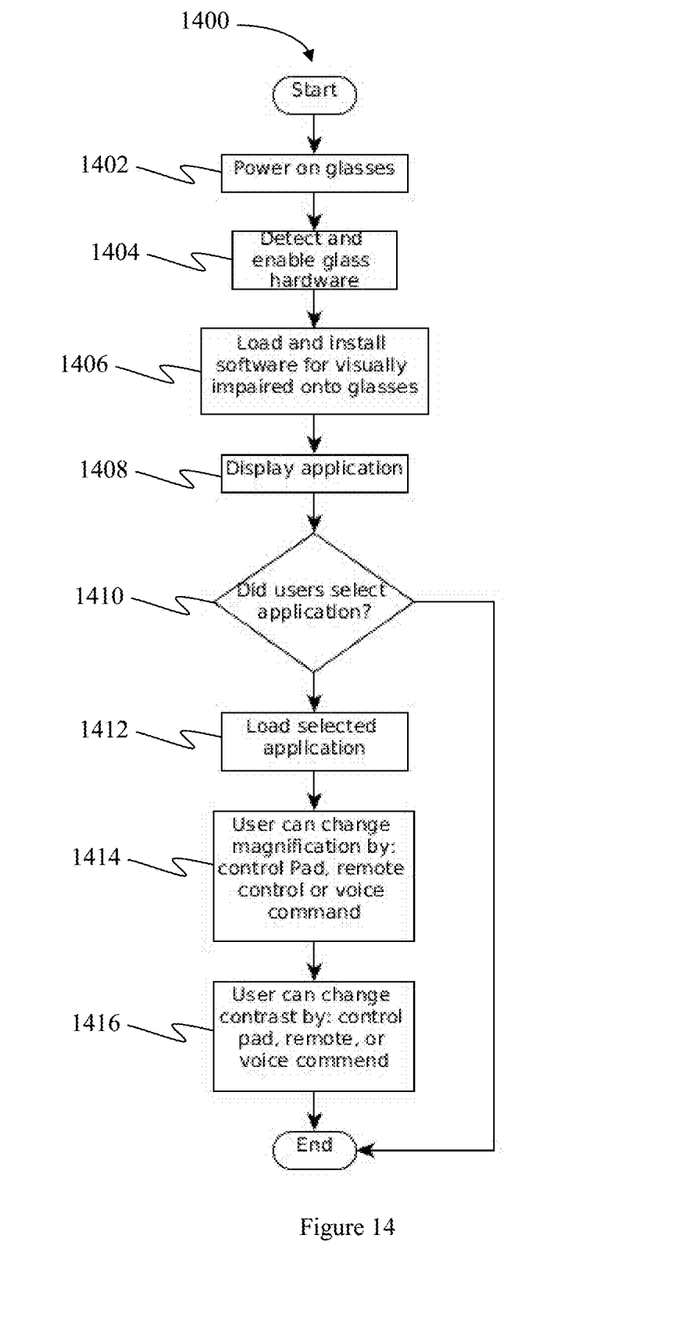
FIG. 14 is a flowchart diagram of some steps of a method for operating the system for augmented reality for vision of FIG. 1.

Referring now to FIG. 14, there is shown a flowchart diagram 1400 of some steps of a method for operating the system for augmented reality for vision of FIG. 1. When the system 100 is powered on 1402, the system 100 comprises instructions executable on the one or more than one processor 108 to: automatically detect the hardware 1404 capabilities of the system 100. Then, load and install instructions for visually impaired 1406 users onto the system 100. Next, available applications are displayed 1408 to the user based on the detected hardware available on the system 100. Then, when a user selects 1410 an available application it is retrieved 1412 from the storage connected to the one or more than one processor 108 and loaded for execution. Next, the user can change the magnification 1414 to view the selected application using the track pad 402, the remote control 800 or by voice command. Finally, the user can change the contrast 1416 of the selected application using the track pad 402, the remote control 800 or by voice command.

Additionally, the system 100 further comprises instructions to perform the following:

1. Auto-focusing the one or more than one display lenses 104 and 106 is set to continuous but locked at set distances determined by magnification settings;
2. Variable magnification can be adjusted to, but not limited to, 0× (or no mag) up to at least 12×, depending on the available hardware;
3. Use contrast filters specifically designed to enhanced the visually impaired experience above a threshold.
4. Voice In/Voice Out—using various voice frequencies and algorithms set to commands and key phrases that control the system 100 enabling hands free control.
5. TTS/OCR-executing instructions located on the system 100 to read back text, signs or any printed material up to but not limited to 10 ft from said device without using any external services.
6. Voice controlled recording or picture taking for visually impaired and/or surgical and dental loupes, where the recording or the pictures are then stored to an on-board gallery or transmitted to a secure server or electronic medical record.

7. A secure on board gallery that can store images and recordings for future download.

8. Changing the lens attached to the one or more than one camera 102 to take a 50 degree electronically magnified image at distances of great than 50+ feet and cut the field of view down to 30 degree in turn creating a clear image. The lens can also be affixed or taken off of the smart glasses.

What has been described is a new and improved system and method for a system for using augmented reality for vision, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A computer-implemented method for an augmented reality system for vision, operable and upgradeable on different portable, wearable and self-contained hardware platforms that is easily adjustable by the user, comprising executing on one or more than one processor the steps of: a) providing a portable, wearable and self-contained hardware platform, where the hardware platform comprises at least: 1) a frame; 2) one or more than one display lenses attached to the frame; 3) one or more than one camera operably connected to the frame; 4) wired, wireless or both wired and wireless communications means for transferring power, data or both power and data to the hardware platform connected to the frame 5) a wired, wireless or both wired and wireless input device for controlling the hardware platform operably connected to the frame; 6) one or more than one processor for executing instructions connected to the frame; and 7) a storage attached to the processor for storing instructions, applications and data connected to the frame; b) executing instructions on the one or more than one processor to automatically detect the hardware capabilities of the portable, wearable and self-contained hardware platform; c) loading and installing instructions for a user onto the portable, wearable and self-contained hardware platform; d) displaying available applications to the user based on the detected hardware available on the portable, wearable and self-contained hardware platform; e) selecting an available application; f) retrieving the selected application from a storage connected to the one or more than one processor; g) executing the retrieved instructions for the selected application; h) changing the magnification to view the selected application; i) changing the contrast of the selected application using the track pad, the remote control or by voice command; j) auto-focusing the one or more than one display lenses, where the one or more than one display lenses are set to continuous auto focus but locked at set distances determined by magnification settings; k) adjusting a magnification of the one or more than one display lenses; l) selecting and overlaying contrast filters specifically designed to enhanced visually impaired experience above a threshold, m) enabling hands free control using various voice frequencies and algorithms set to commands and key phrases that control the portable, wearable and self-contained hardware platform; n) executing instructions located on the portable, wearable and self-contained hardware platform for reading back text, signs or any printed material; o) recording multimedia information from the portable, wearable and self-contained hardware platform; p) displaying an onboard gallery of stored multimedia information; q) electronically changing the one or more than one display lenses attached to the one or more than one camera to take a 50 degree electronically magnified image at distances of greater than 50 feet and editing the field of view down to 30 degree creating a clear image.

2. The method of claim 1, where the step of selecting an available application is performed using a track pad.

3. The method of claim 1, where the step of selecting an available application is performed using a remote control.

4. The method of claim 1, where the step of selecting an available application is performed using a voice command.

5. The method of claim 1, where the magnification can be adjusted from 0× magnification up to at least 12× magnification, depending on the available hardware.

6. The method of claim 1, where the step of reading back text, signs or any printed material is operable to a distance of at least 10 feet from the one or more than one camera within the system without using any external services.

7. The method of claim 1, where the multimedia information is stored to the storage attached to the one or more than one processor for later download.

8. The method of claim 1, where the multimedia information is transmitted wired, wirelessly or both wired and wirelessly to a secure server or electronic medical record.

* * * * *